United States Patent
Gross et al.

(10) Patent No.: US 7,837,966 B2
(45) Date of Patent: Nov. 23, 2010

(54) DESTRUCTION OF HYDROCARBON EMISSIONS

(75) Inventors: Kenneth B. Gross, Troy, MI (US);
Daniel Dziedzic, Rochester Hills, MI (US); John T. Johnson, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 841 days.

(21) Appl. No.: 11/064,523

(22) Filed: Feb. 23, 2005

(65) Prior Publication Data
US 2006/0034744 A1 Feb. 16, 2006

Related U.S. Application Data

(60) Provisional application No. 60/600,523, filed on Aug. 11, 2004.

(51) Int. Cl.
*B01D 53/44* (2006.01)
(52) U.S. Cl. .................. 423/245.1; 423/245.3; 702/22; 702/23; 702/30; 588/309; 588/312; 588/405
(58) Field of Classification Search ............. 423/245.1, 423/245.3, 340; 702/22, 23, 30; 588/309, 588/312, 405
See application file for complete search history.

(56) References Cited

U.S. PATENT DOCUMENTS

| | | | |
|---|---|---|---|
| 4,863,687 A | 9/1989 | Stevens et al. | |
| 5,832,411 A * | 11/1998 | Schatzmann et al. | 702/23 |
| 5,904,750 A * | 5/1999 | Cowles | 95/109 |
| 6,048,500 A | 4/2000 | Caren et al. | |
| 6,372,018 B1 * | 4/2002 | Cowles | 95/18 |
| 6,620,385 B2 * | 9/2003 | Fujii | 422/186.3 |
| 6,649,218 B2 * | 11/2003 | Qian | 427/255.31 |
| 7,014,824 B2 * | 3/2006 | Krodel et al. | 423/210 |
| 2004/0055621 A1 * | 3/2004 | McDermott et al. | 134/1.3 |

OTHER PUBLICATIONS

Y. Shen and Y. Ku, Treatment of Gas-phase Volatile Organic Compounds (VOCs) by the UV/O3 Process, Chemosphere, vol. 38, No. 8 pp. 1855-1866, 1999.
N. Takahashi, Ozonation of Several Organic Compounds Having Low Molecular Weight Under Ultraviolet Irradiation, Ozone Science & Engineering, vol. 12, pp. 1-18.

* cited by examiner

*Primary Examiner*—Ngoc-Yen M Nguyen
(74) *Attorney, Agent, or Firm*—Reising Ethington P.C.

(57) ABSTRACT

Ozone and, if necessary, water is added to an exhaust gas, such as air, containing hydrogen- and carbon-containing molecules of a pollutant. The exhaust gas is then continually flowed into one or more oxidizing reaction chamber modules. In the reaction chamber(s) the ozone- and water-containing gas is subjected to intense ultraviolet radiation (wavelength of 254 nm) to promote the formation of hydroxyl radicals to oxidize the pollutant molecules to carbon dioxide and water. The continually discharged gas is analyzed for residual ozone and hydrocarbon content and the analytical data used in feedback control of ozone addition and UV radiation intensity.

12 Claims, 2 Drawing Sheets

DESTRUCTION OF HYDROCARBON EMISSIONS

REFERENCE TO RELATED APPLICATION

Applicants claim priority of Provisional Patent Application Ser. No. 60/600,523, filed Aug. 11, 2004.

TECHNICAL FIELD

This invention pertains to the oxidation of hydrogen- and carbon-containing organic molecules to carbon dioxide and water when such substances are in, or exposed to, a gaseous medium that contains water and ozone. More specifically, this invention pertains to a process, apparatus and control system for oxidation of abundances of such hydrogen- and carbon-containing molecules using ultraviolet radiation to induce the formation of oxidizing hydroxyl radicals in a suitable mixture of ozone and water.

BACKGROUND OF THE INVENTION

Industrial processes often result in air volumes containing excessive amounts of hydrocarbon molecules such as propane, pentane, or xylene and/or oxygen-carbon-hydrogen containing molecules such as alcohols, aldehydes, ketones and organic acids. Such organic molecules are referred to generically as HC in this text. Certain metal casting processes also result in foundry sand coated with HC-containing residues.

Airborne HC-containing exhaust streams have been subjected to regenerative thermal oxidation (RTO) or regenerative catalytic oxidation (RCO) processes to destroy the unwanted substances. But these thermal processes require fuel and are conducted in special reactors under very high temperature conditions. They require catalyst regeneration (in the case of RCO), and they are expensive for treating HC contaminants in a large volume of air. Furthermore, these thermal processes yield oxides of nitrogen which are considered an environmental problem.

It has also been proposed to use ozone at ambient temperatures for the complete oxidation of HC molecules to carbon dioxide and water. Ozone, $O_3$ the triatomic molecule of oxygen, is a more powerful oxidizing agent than ordinary oxygen. But the susceptibility of the wide range of organic substances in industrial environments to destructive oxidation by ozone varies widely. Ozone has not provided a strong enough tool in treating industrial wastes.

There are manufacturing operations, for example automobile and truck painting operations, from which volumes of HC-containing air are exhausted. In these operations the composition and amount of the HC species varies as does the flow rate of the air stream. There is a need for improved methods, operable at close to ambient temperatures, for the destructive oxidation of unwanted HC substances in air streams. There is a need for such oxidation methods especially where the streams vary in flow rate and HC content. There is a need to provide for more effective use of ozone in the destructive oxidation of hydrogen- and carbon-containing industrial contaminants.

SUMMARY OF THE INVENTION

This invention is particularly useful for treating contaminated air exhausted from manufacturing processes. The general compositional nature of HC pollutants from a particular plant area or process may be known but it is usually impractical to continuously identify specific HC constituents and amounts. For example, air exhausted from a paint shop in an automobile manufacturing plant contains solvent vapor and paint constituents of varying composition, typically specified in hundreds of parts of HC-per-million parts of exhaust air (ppm). In a particular painting installation the total carbon loading of the airborne organics can be suitably determined on a continuing basis, and the exhaust flow rate in cubic feet (or cubic meters) per minute is known.

In accordance with the invention, ozone is added to the exhaust in an amount suitable for promoting oxidation of the organic contaminants as the exhaust is blown into an oxidation reaction chamber (hereinafter usually referred to as "reaction chamber" for brevity). The reaction chamber is shaped and sized to permit a suitable flow path and residence time for destructive oxidation of the contaminants in the air stream, and treated air is removed from the reaction chamber in a generally continuous flow rate. Ambient air in plant environments typically contains sufficient moisture for the generation of hydroxyl radicals in accordance with this invention; otherwise, water vapor is added to the exhaust stream before its entry into the reaction chamber.

In the reaction chamber the mixture of airborne organic molecules, ozone and water is subjected to ultraviolet radiation at wavelengths centered at 254 nm. UV light of this energy interacts with ozone molecules to produce oxygen radicals (O*) and diatomic oxygen molecules. The oxygen radicals react with water to produce hydroxyl radicals (OH*) which are very effective in oxidizing HC pollutant molecules. Although the air stream mainly contains oxygen and nitrogen molecules, the hydroxyl radicals in the oxygen- and ozone-containing mixture remove HC molecules by destructive oxidation to $CO_2$ and $H_2O$. Preferably, the flow of the air stream in the reaction chamber changes direction or otherwise induces suitable mixing of reacting species in the stream. Thus, as the air stream flows through the reaction chamber, its HC content is steadily depleted.

The air stream leaving the reaction chamber is continually monitored for residual ozone and carbon content (as HC) and this information is used in control of the HC oxidation process. When residual ozone content in the exiting air stream is excessive and/or HC content suitably low, ozone input to the reaction chamber is reduced. Conversely, low ozone content in the treated air coupled with high HC content may indicate higher ozone input to the reaction chamber. Excessive ozone and HC contents in gas leaving the reaction chamber may also indicate that local intensity or total amount of UV radiation needs to be altered.

In some manufacturing plants a single oxidation reaction chamber may be sized to accommodate the largest volume of HC-contaminated air expected to be exhausted from the plant. However, there are situations in which the volume of exhausted air varies widely, and in which it will be more practical and efficient to have more than one reaction chamber available. Thus the practice of the invention may use more than one reaction chamber to accommodate contaminated industrial air streams of widely varying flow rates or air streams containing organic contaminants of different oxidation propensities. In other words, reaction chambers of equal or incrementally additional volumes may be used in groups or modules. Thus, for example, unneeded reaction chambers may be bypassed, or the contaminated air stream may be routed in series or parallel flow through additional previously unused reaction chambers. Each reaction chamber is provided with sufficient ozone and water to form hydroxyl radicals for the current HC content of the air stream. Each reaction chamber is provided with sufficient UV lights so that a suitable number are turned on for a UV energy requirement. And each reaction chamber has an air stream flow path that provides in suitable combination: exposure to UV bulbs, mixing of reacting radicals and molecules within the stream, and air stream residence time for completion of desired oxidation of HC molecules.

Other objects and advantages of the invention will be appreciated from a more complete description of preferred embodiments that follows.

Figure 3:
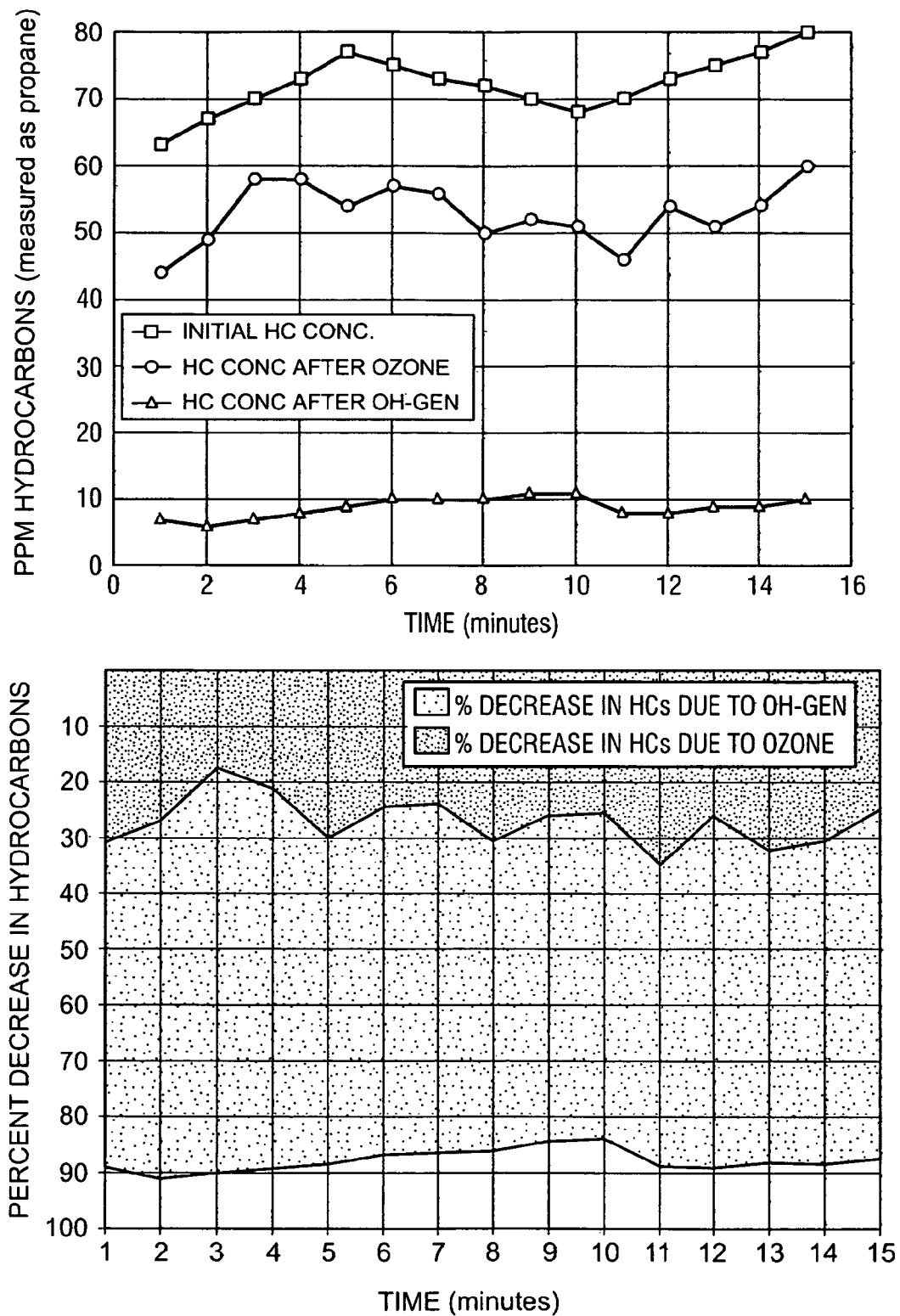
FIG. 3 includes two closely related graphs. The upper graph presents data of total hydrocarbon content in untreated and treated exhaust air stream from automotive paint booth operations. In two-different experiments of fifteen-minute duration the moisture containing exhaust stream was (1) treated with ozone without UV radiation and (2) treated with UV-generated hydroxyl radicals (termed OH-GEN). The square data point line presents the initial HC content of the air stream. The circle data point line presents the HC content after ozone (alone) oxidation, and the triangle data point line presents the HC content after OH radical oxidation. The total carbon content was measured and reported as propane.

The lower graph of FIG. 3 is a graph over the same 15 minute time period of oxidation treatment of painting operations exhaust showing percentage decrease in HCs due to ozone-oxidation and percentage decrease in HCs due to OH radical oxidation (OH-GEN).

DESCRIPTION OF PREFERRED EMBODIMENTS

Figure 1:
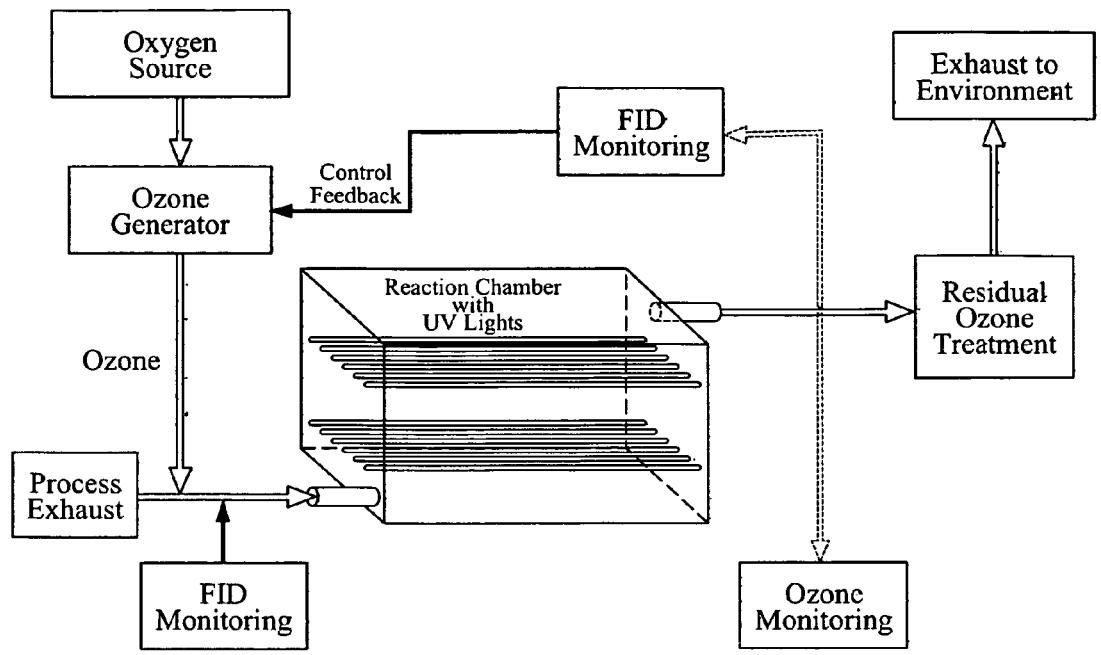
FIG. 1 is a flow diagram for the destructive oxidation of HC molecules in an air stream exhausted from a manufacturing plant. The flow diagram illustrates process exhaust flow and ozone flow into and out of a reaction chamber. The flow diagram also illustrates analytical control strategies for the operation of a reaction chamber.

The text in various blocks, of the flow diagram of FIG. 1 contains capitalization of initial letters of words for readability of the diagram. When these words are used in the following text they are not capitalized unless they are the first word of a sentence.

In the center of FIG. 1 is shown a reaction chamber for the destructive oxidation of unwanted carbon- and hydrogen-containing molecules (HC) in a process exhaust. The volumetric capacity of the reaction chamber is sized to provide suitable residence time for the oxidation of HC in a stream of process exhaust entering the lower left side of the reaction chamber. In a typical manufacturing plant the volumetric rate of flow (e.g., ft$^3$/min) of a process exhaust into a reaction chamber is known and can be continually monitored by a flow measuring device(s), not indicated in the FIG. 1 flow diagram. Similarly, a flame ionization detector (FID) may be used to monitor the total carbon content per unit volume of the flowing process exhaust stream. Other chemical analyzers may be used for the process exhaust depending on the analytical control needs of the destructive oxidation process.

A suitable quantity of ozone is added to the process exhaust stream, preferably before the stream enters the reaction chamber. As illustrated at the left side of FIG. 1, a suitable oxygen source such as air, oxygen-concentrated air, or bottled oxygen is passed through a suitable ozone generator and the resulting ozone-containing air or ozone-containing oxygen stream is added to and mixed with the process exhaust stream. Initially the quantity of ozone may be estimated or specified based on the properties of the process exhaust. But, preferably, the flow rate of ozone is continually adjusted based on chemical analyses of the treated air leaving the upper right side of the reaction chamber and labeled as exhaust to environment.

Most process exhaust streams will contain an abundance of water due to normal humidity in manufacturing-plant atmospheres. For example, process exhaust streams at 100° F. and fifteen to twenty five percent relative humidity contain sufficient water for the oxidation of streams containing HC at levels of a few hundred ppm to a thousand ppm. But where a process exhaust does not contain sufficient water, more is added to the stream before it enters the reaction chamber.

The reaction chamber contains a suitable number of UV lights generating radiation at a wavelength of 254 nanometers or at a narrow range including that wavelength. Conveniently tubular UV light bulbs are used. An electrical power source, not shown, is provided for the lights. And the lights may be grouped in zones, or powered and controlled individually, for management of the amount of UV radiation emitted into the reaction chamber. The UV lights are spaced, as shown, throughout the reactor chamber to effectively irradiate the entire gas volume in the reaction chamber.

Stimulated by UV radiation, some of ozone molecules in the reaction chamber form oxygen radicals and diatomic oxygen molecules as summarized by the equation: $O_3 + h\nu \rightarrow O^* + O_2$. Oxygen radicals react with water molecules to form hydroxyl radicals as per $O^* + H_2O \rightarrow 2\ OH^*$. Hydroxyl radicals have very effective oxidizing potential for a wide range of HC materials and, in the presence of unreacted ozone and oxygen in the process exhaust mixture, convert most of the varied HC molecules to carbon dioxide and water through a series of reactions.

The flow rate of treated air from the reaction chamber matches the input of process exhaust and much of the HC content is destroyed. In accordance with the process control aspect of this invention the residence time of the gases in the reactor, the volumetric rate of ozone addition, and the intensity of UV radiation are managed to maximize HC oxidation and minimize ozone discharge. Ozone monitoring instruments analyze the ozone content of the process exhaust from the reaction chamber. Flame ionization detector instruments (FID Monitoring in the drawing, FIG. 1) are used to measure the total HC content of the process exhaust from the reaction chamber. Ozone monitoring involves comparative parallel UV absorption analysis of the treated stream exiting the reactor chamber and an ozone-depleted branch of the stream.

To the extent that ozone content of the process exhaust is excessive, the exiting stream is treated to destroy the ozone (residual ozone treatment block in FIG. 1) before the stream is discharged to the environment. The ozone analysis coupled with the HC analysis is used in control feedback to balance ozone additions to the process exhaust stream so as to minimize both ozone and HC contents of the process exhaust stream exiting the reactor chamber to the environment. Where ozone and HC discharges are attributable to low UV radiation, more UV lights are turned on in the gas mixture.

An important application for this invention is in plant environments in which exhaust streams must be treated that have different flow rates and different HC contaminant species in different quantities. In this situation it may be preferred to provide more than one oxidation reaction chamber for treatment of process exhaust air streams. A basic reaction chamber is designed and provided for handing a predetermined volume of HC contaminated air. The reaction chamber provides UV bulbs located along a process exhaust flow path for effective oxidation of a specified HC load or burden over a range of air stream flow rates. Ozone and water content is controlled for generation of a suitable quantity of hydroxyl radicals for HC oxidation. The UV bulbs are independently controlled for some specified variation in hydroxyl radical oxidation capacity. But where additional oxidative capacity is required from time-to-time, additional reaction chambers may be provided for increased capacity. The additional reaction chambers may be of the same capacity as the first reaction chamber or of specified multiple or fractional capacities. Two or more reaction chambers may be arranged for series flow of an air stream at a given flow rate when additional residence time of exposure to hydroxyl radicals is needed for suitable destructive oxidation of its HC content. Two or more reaction chambers are arranged for parallel flow of an air stream when its flow rate exceeds the capacity of a single reaction chamber.

Figure 2:
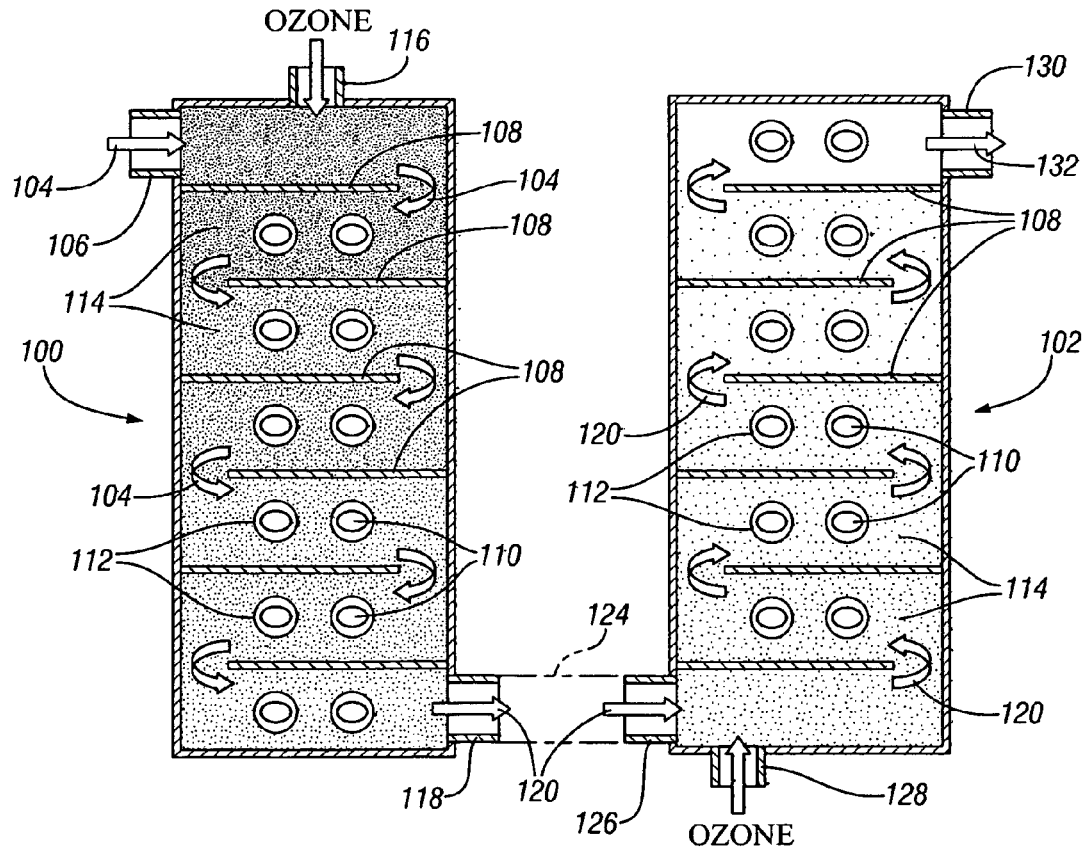
FIG. 2 is a schematic, cross-sectional view of two substantially identical reaction chambers for oxidative destruction of air borne contaminants in accordance with an embodiment of the invention.

FIG. 2 illustrates two substantially identical oxidation reactors 100, 102 arranged for, series flow of a process exhaust air stream. The process exhaust air stream comprises, for example, air drawn by blowers through a suitable duct system from vehicle painting booths in an automotive manufacturing plant. The volumetric flow rate of the process exhaust air stream may be about 50,000 cubic feet/minute (at standard temperature/pressure conditions) and contain a total of about 75 ppm of many different gaseous or vaporous HC molecular species from painting solvents and polymer materials and additives. The air stream may, for example, have a temperature of about 100° F. and a relative humidity of 20%. Oxidation reactors 100, 102, which are arranged for series or sequential flow of the air stream, are shown in cross-sectional elevation view.

The process exhaust air stream (the air stream and its flow path indicated by arrows 104) is blown through suitable sheet metal ducting, not shown, to inlet 106 at the top of reaction chamber 100. The flow of process exhaust air stream 104 in reaction chamber 100 is back and forth as indicated by the labeled directional arrows. The flow of process exhaust 104 progresses downwardly around a series of vertically spaced, partial width, horizontal flow partitions 108. Positioned front-to back, as viewed in FIG. 2, is a suitable number of UV radiating bulbs (tubes) 110 of specified power output, each encased in a quartz tube 112 for isolation from the process exhaust. UV bulbs are commercially available in, for example, five-foot lengths and the depth of oxidation reactors 100, 102 may be, for easy bulb replacement and maintenance, the length of one or more UV bulbs. The UV bulbs may be inserted through openings, not shown, in the front or back of reactors 100, 102. As illustrated in FIG. 2, a suitable number of UV bulbs 110 are inserted in each horizontal flow passage 114 (except the top passage) defined between facing sides of adjacent horizontal flow partitions 108. Ozone is introduced through inlet 116 in the top of reactor 100 and mixes with incoming process exhaust air stream 104 in the horizontal flow passage above the upper partition 108.

As the HC containing process exhaust 104 flows back and forth and downwardly between successive partitions 108, the UV radiation stimulates O* radical formation from the ozone and the reaction of O* radicals with water, as described above, to generate OH* radicals for effective oxidation of the HC species. Oxidation of the HC contaminants thus progresses as the process exhaust 104 flows to the bottom outlet 118 of reactor 100. The progressive destructive oxidation of HC pollutant molecules is indicated schematically in FIG. 2 by the decreasing density of dots (representing HC molecules) in the process exhaust 104. The process exhaust air stream flowing out of reaction chamber outlet 118 is now viewed as a one-time treated process exhaust 120.

In the modular oxidation practice of this invention, the treated air stream 120 exiting reaction chamber 100 at outlet 118 could be directed and vented to the atmosphere if its HC content has been reduced to a suitable level. Otherwise, oxidation of the partially decontaminated, one-time treated process exhaust stream 120 is continued in a second reaction chamber 102 as illustrated in FIG. 2.

Reaction chamber 102 is designed and constructed much like reaction chamber 100 except that, conveniently, the flow of one-time treated process exhaust 120 is directed upwardly from the bottom to the top of reactor 102. Again, both the presence and flow direction of the process exhaust in reaction chamber is indicated by arrows 120 Process exhaust 120 flows through connecting duct 124, and enters inlet 126 at the bottom of reaction chamber 102.

Reaction chamber 102 is shaped like reactor 100 and contains the same vertically spaced, horizontal partitions 108 extending most of the width of reaction chamber 102 to suitably define successive flow passages 114 for the upward flow of process exhaust 120. Each horizontal passage 114, except the bottom one is fitted with UV radiation bulbs 110 contained in quartz tubes 112. Ozone is introduced through inlet 128 at the bottom of reaction chamber 102 and mixes with process exhaust 120 in the lowermost horizontal flow passage. Oxidation of HC contaminants in process exhaust 120 continues in reaction chamber 102 and the now twice-treated process exhaust 132 leaves through outlet 130 from the uppermost horizontal passage of reaction chamber 102.

As the HC-containing process exhaust air stream progresses successively through reactors 100, 102, the HC contaminants are destructively oxidized by the action of hydroxyl radicals and ozone. The HC content and ozone content of the process exhaust streams 104, 120 and 132 are continually and progressively monitored as described in FIG. 1. The activation of the respective several UV bulbs 110 and the control of ozone additions at 116 and 128 are used to reach a suitable HC contents in process exhaust streams 120 and 132.

It is recognized that the generation of ozone is a major expense item in the destructive oxidation of HCs in process exhaust air streams. Preferably, the oxidation process is controlled to make effective use of ozone and minimize its content in process exhaust streams leaving reaction chambers.

A practice of the invention has been demonstrated on a process exhaust air stream drawn from automotive plant paint booths. A relatively low flow volume of about two liters per minute was withdrawn from the duct in a plant carrying the process exhaust stream. This side stream flow was diverted to two glass oxidation reactors arranged in series flow relationship like the oxidation reaction chambers illustrated in FIG. 2. The side stream was at about 100° F. and about 20% relative humidity so no additional water was added to the stream for oxidation.

Bottled oxygen was delivered through a mass flow controller to an ozone generator and the generated ozone was continuously mixed with the side stream paint exhaust in a mixing chamber made of Teflon® before the mixed streams entered the first oxidation reaction chamber. Flow lines and instrumentation was provided for FID analysis of total HC content and ozone monitoring of the paint exhaust flowing into the first glass oxidation reaction chamber and the oxidized stream flowing from the second oxidation reaction chamber.

Each glass oxidation reaction chamber of about four-liter capacity was fitted with three 18-inch long, 15-watt UV bulbs. During testing of the hydroxyl radical oxidation of the HC-containing process exhaust, the bulbs were activated to generate OH radicals as described above in this specification. For purposes of comparison, the bulbs were turned off in a test period of like duration to compare the oxidation effect of ozone and air (no hydroxyl radicals) on the HC constituents in the paint booth exhaust.

The upper graph in FIG. 3 summarizes data collected during 15-minute oxidation tests on the paint booth exhaust. The carbon content in ppm of the exhaust stream was measured by FID for 15-minute oxidation tests. The output of FID was calibrated with propane for data comparison although there was no propane in any process exhaust stream, treated or untreated. The HC content (measured as propane) of the incoming exhaust is seen (unfilled-squares data points) to vary between about 62 ppm and 80 ppm over a test period. HC content after (1) ozone alone oxidation and (2) after OH radical oxidation (OH-GEN) was also measured by FID for 15-minute test periods. The HC content of the exhaust gas after ozone oxidation (unfilled-circles data points) is seen to vary rather widely between about 43 ppm and 60 ppm. But the propane content after OH radical oxidation (unfilled triangles data points) was reduced more consistently to levels between about 6 ppm and 11 ppm.

The data in the upper graph of FIG. 3 is presented again in the lower graph of FIG. 3 in terms of percentage decrease in HC content measured as propane. Again ozone-alone oxidation resulted in percentage varying decreases in propane content of between about 18% and 35%. Hydroxyl radical oxidation (OH-GEN) produced markedly greater and more consistent reductions (about 85% to about 91%) in HC content.

In addition to the treatment of contaminated air streams, a reaction chamber can be used to attack hydrocarbons residing on a solid surface. For example, HC accumulated on sand used to embed Styrofoam® casting patterns in lost-foam casting processes could be treated. The contaminated sand particles could be suspended in the reaction chamber by circulating humidified air. Sufficient ozone in monitored amounts would be added to the reactor chamber. This practice could thus utilize the reaction chamber in a batch mode. The sand particle fluidizing air with its UV generated hydroxyl radicals could accumulate the byproducts of HC oxidation until the sand was suitably cleaned. The air stream from the treatment of HC coated sand particles could be treated with additional ozone and UV radiation for oxidation of remaining HC.

The practice of the invention has been illustrated in the destructive oxidation of carbon-, hydrogen- and oxygen-containing organic compounds. However, the process may also be used for the oxidation of hydrocarbons and oxygen containing organic compounds that also contain a halogen such as chlorine. The scope of the invention is not limited by the illustrative examples.

The invention claimed is:

1. A method of oxidizing hydrogen- and carbon-containing molecules of pollutant substances in water-containing air exhausted from a manufacturing operation, the exhausted air having a content of pollutant substances that can vary in composition and amount, the method comprising:
   continually adding a quantity of ozone to a flowing stream of the air;
   adding water, if necessary, to the flowing stream;
   continually passing the ozone-containing and water-containing air stream through a flow passage for oxidation of the pollutant substances, the flow passage having a flow passage inlet and a flow passage outlet;
   progressively subjecting the ozone-containing and water-containing air stream to ultraviolet radiation along the flow passage to progressively form hydroxyl radicals for continual oxidation of the pollutant molecules as the air stream flows along the flow passage;
   continually discharging the air stream from the flow passage outlet;
   analyzing the discharged air stream to obtain a measure of any residual quantities of ozone and pollutant substances; and
   using measured quantities of ozone and pollutant substances in control of addition of ozone and the quantity of UV radiation.

2. A method of oxidizing hydrogen- and carbon-containing molecules of pollutant substances in air as recited in claim 1 and comprising:
   reducing the quantity of ozone added to the flowing air stream when the measured ozone quantity in the discharged air stream exceeds a predetermined value.

3. A method of oxidizing hydrogen- and carbon-containing molecules of pollutant substances in air as recited in claim 1 and comprising:
   increasing the quantity of ozone added to the flowing air stream when the measured pollutant substances quantity in the discharged air stream exceeds a predetermined value.

4. A method of oxidizing hydrogen- and carbon-containing molecules of pollutant substances in air as recited in claim 1 and comprising:
   increasing the quantity of UV radiation added to the flowing air stream when the measured pollutant substances quantity in the discharged air stream exceeds a predetermined value.

5. A method of oxidizing hydrogen- and carbon-containing molecules of pollutant substances in an air stream as recited in claim 1 and comprising:
   increasing the quantity of UV radiation added to the flowing air stream when the measured ozone quantity in the discharged air stream exceeds a predetermined value.

6. A method of oxidizing hydrogen- and carbon-containing molecules of pollutant substances in an air stream as recited in claim 1 and comprising:
   decreasing the quantity of UV radiation added to the flowing air stream when the measured ozone quantity in the discharged air stream is below a predetermined value.

7. A method of oxidizing hydrogen- and carbon-containing molecules of pollutant substances in an air stream as recited in claim 1 and comprising:
   decreasing the quantity of UV radiation added to the flowing air stream when the measured pollutant substances quantity in the discharged air stream is below a predetermined value.

8. A method of oxidizing hydrogen- and carbon-containing molecules of pollutant substances air as recited in claim 1 and comprising:
   dividing the flow of ozone- and water-containing air stream into two or more parallel streams and
   continually introducing the divided air streams into two or more flow passages.

9. A method of oxidizing hydrogen- and carbon-containing molecules of pollutant substances in air as recited in claim 1 and comprising:
   continually adding a quantity of ozone to a flowing stream of the air;
   adding water, if necessary, to the flowing stream;

continually passing the ozone-containing and water-containing flowing stream of air through a first flow passage and continually discharging the air stream from the first flow passage outlet;

continually adding a quantity of ozone to the air stream discharged from the first flow passage;

continually passing the air stream discharged from the first flow passage through a second flow passage;

subjecting the air stream in each of the first and second flow passages to ultraviolet radiation to form hydroxyl radicals for oxidation of the pollutant molecules;

continually discharging the air stream from the second flow passage outlet;

analyzing the discharged air stream from at least one of the first and second flow passage outlets to obtain a measure of any residual quantities of ozone and pollutant substances;

using measured quantities of ozone and pollutant substances in control of additions of ozone and the quantities of UV radiation used in the first and second flow passages; and wherein at least one of the first flow passage or the second flow passage is configured as a serpentine flow passage.

10. A method of oxidizing hydrogen- and carbon-containing molecules of pollutant substances in air as recited in claim 1 in which the flow passage is a reaction chamber with a top and a bottom having a flow passage inlet at either the top or bottom and a flow passage outlet at the bottom or top of the reaction chamber opposite the flow passage inlet.

11. A method of oxidizing hydrogen- and carbon-containing molecules of pollutant substances in air as recited in claim 1 in which the flow passage is a reaction chamber having a plurality of spaced partitions for continually causing a change in direction of the air stream as it flows from the flow passage inlet to the flow passage outlet.

12. A method of oxidizing hydrogen- and carbon-containing molecules of pollutant substances in air as recited in claim 9 in which the first and second flow paths are equivalent.

\* \* \* \* \*